J. S. SCHOOP.
SIPHON.
APPLICATION FILED JAN. 11, 1912.

1,048,744.

Patented Dec. 31, 1912.

Witnesses
James E. Sproll.
J. E. Bonnell.

Inventor
John S. Schoop.
By
Adams & Brooks
Attorneys

UNITED STATES PATENT OFFICE.

JOHN S. SCHOOP, OF SEATTLE, WASHINGTON.

SIPHON.

1,048,744.  Specification of Letters Patent.  Patented Dec. 31, 1912.

Application filed January 11, 1912. Serial No. 670,705.

*To all whom it may concern:*

Be it known that I, JOHN S. SCHOOP, a citizen of the United States of America, and a resident of the city of Seattle, in the county of King and State of Washington, have invented certain new and useful Improvements in Siphons, of which the following is a specification.

My invention relates to siphons, having more particular reference to a device of this type especially adapted for skimming or removing cream from milk, and has for a fundamental object the provision of a novel construction including a device for starting siphonic action.

A further object resides in the provision of a cream collector in which the receiving end of the tube is arranged to be sealed by the contained fluid.

Other objects will be set forth as my description progresses and those features of construction, arrangements and combinations of parts on which I desire protection, succinctly defined in my annexed claims.

Figure 1:
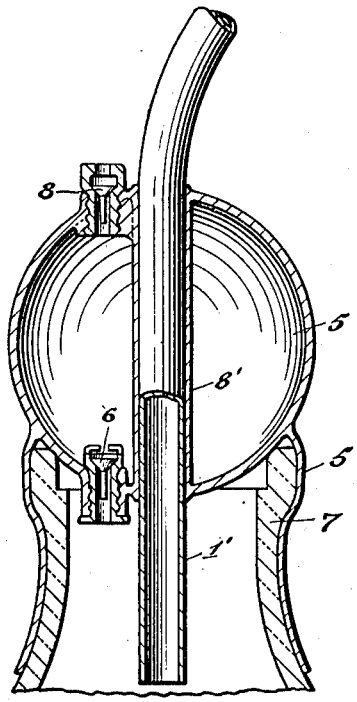
Figure 2:
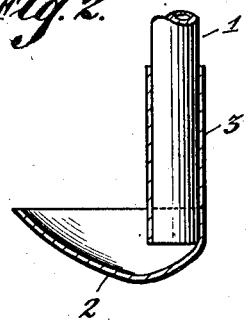
Figure 3:
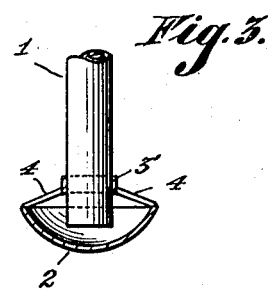

Referring to the accompanying drawing, wherein like numerals of reference indicate like parts throughout the several views: Figure 1 is a fragmentary vertical section, illustrating more particularly the air exhausting device in conjunction with a receiving receptacle and the delivery limb of the siphon tube. Fig. 2 is a sectional detail of my collecting device or receptacle applied to the siphon tube. Fig. 3 illustrates in section a collecting device of slightly modified form, and Fig. 4 is an elevation, with parts broken away, showing my invention as in use.

Referring to the drawing by numerals of reference, 1 indicates a tube for transferring a liquid from one vessel to another, the same being flexible and preferably provided on its shorter limb or receiving end portion with what I term the "collector" 2, the latter being of concave form and of suitable depth to receive tube 1 with its receiving end in submerged condition with respect to the contained fluid.

In the form shown in Fig. 2, the collector is provided with a tubular edge extension 3 which snugly receives the end portion of tube 1 and is conveniently held thereon by friction. In Fig. 3 I have shown a slightly modified form of securing means for the collector, this comprising a comparatively short ring like member 3' supported centrally of the collector by suitable arms 4.

Figure 4:
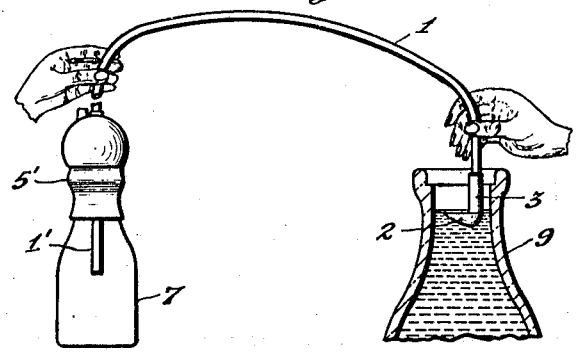

Reference numeral 5 indicates a contractible chamber provided with an intake valve 6, controlling a port on the under side of the chamber for communication with the receiving receptacle, as 7, whereby upon proper manipulation of the elastic wall of the chamber the air can be exhausted from the delivery limb 1' of tube 1 through the receptacle 7 which latter is sealed about chamber 5 against communication with the exterior by the depending tubular elastic flange 5' of the chamber, which is adapted to be fitted snugly about the upper portion of the neck of receptacle 7, as clearly shown in Figs. 1 and 4.

Reference numeral 8 indicates a valve controlling an outlet port provided in the upper portion of chamber 5.

As now considered, I extend the delivery limb 1' through chamber 5, as through a central passage separated from chamber 5 by a tubular partition 8', which construction permits of the tube being slid or adjusted with respect to chamber 5 to enable the lower end of the delivery limb being elevated as receptacle 7 is filled, as will be readily understood.

I have shown my invention adapted for filling bottles with cream and in the operation thereof, chamber 5 is seated on the mouth of the bottle and flange 5' engaged over the neck of the latter, as hereinbefore set forth. Collecting device 2 is now inserted into the vessel, as for example a bottle 9, as shown in Fig. 4, and moved as required to collect the cream. By the provision of a collector of the character described I am enabled to effectually remove the cream practically free from the separated milk. A siphonic action is started through exhausting of the air from receptacle 7 and tube 1 through the alternate compression and expansion of chamber 5, as is apparent.

Having thus described my invention what I claim as new, and desire to secure by Letters Patent of the United States of America, is:—

1. A siphon comprising a member having an elastic wall portion, said member being provided in its wall with valved inlet and outlet ports, a flange on said member projecting outwardly therefrom and extending about the inlet port thereof, in spaced relation thereto and a fluid conducting tube having its delivery limb disposed within the flange of said member and spaced from the inlet port of the latter, for the purpose specified.

2. A siphon comprising an elastic bulb having valved inlet and outlet ports, a depending flange on said bulb extending entirely around one of the ports thereof, and a fluid conducting tube extending through said bulb.

Signed at Seattle, Washington this 29th day of December, 1911.

JOHN S. SCHOOP.

Witnesses:
J. SPUD SMITH,
GERTRUDE McKENNA.